United States Patent Office 2,871,964
Patented Feb. 3, 1959

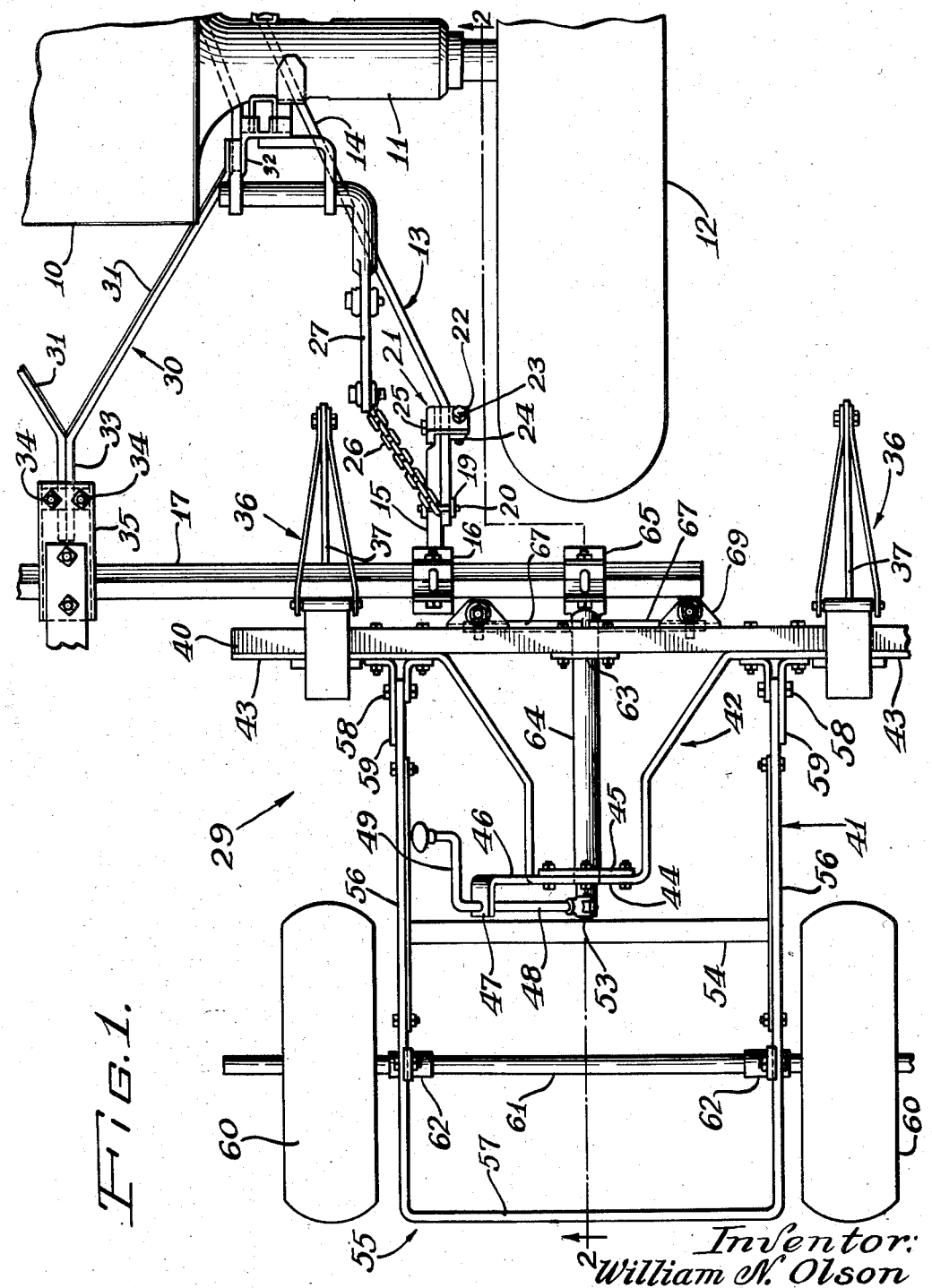

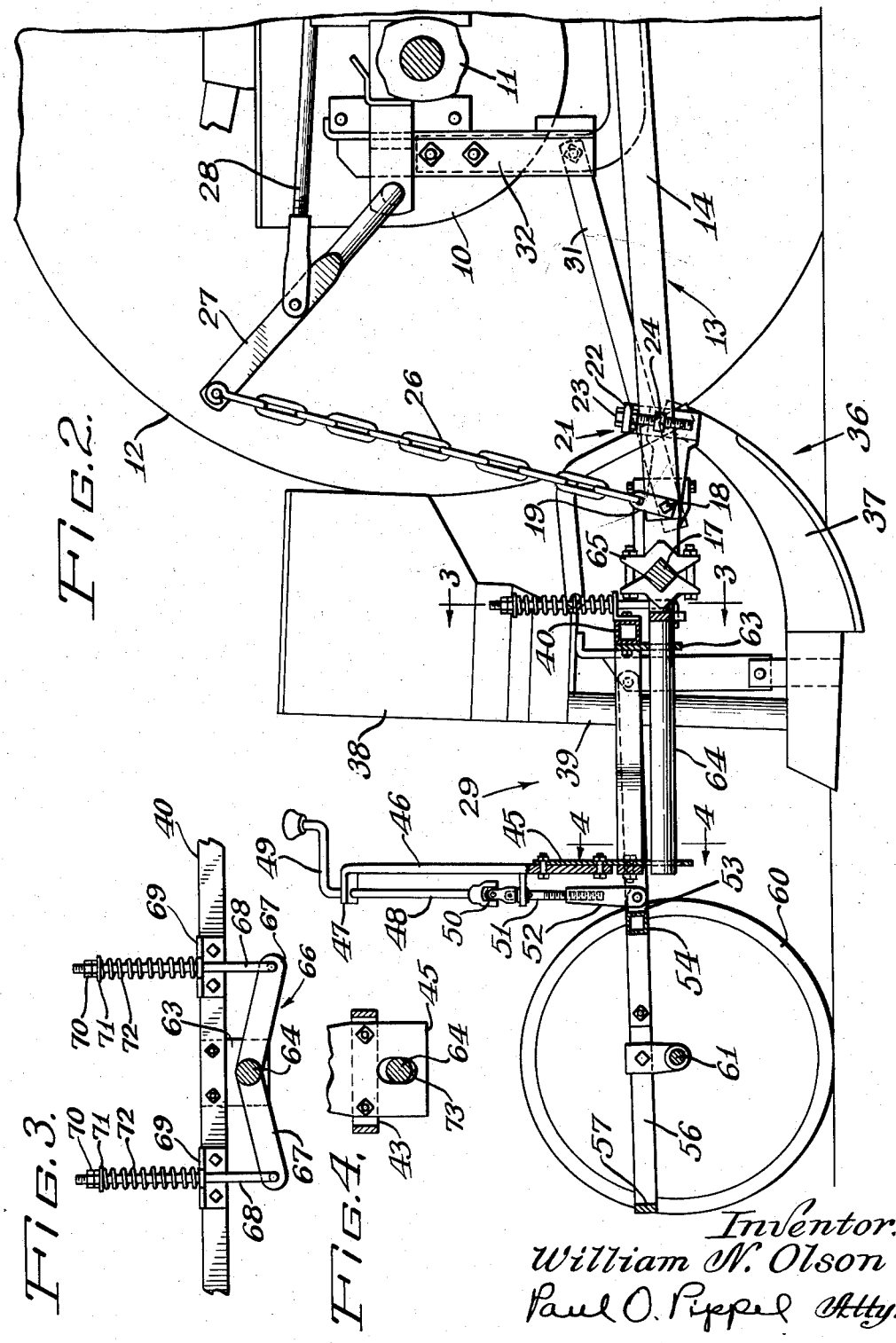

2,871,964

SPRING EQUALIZER FOR FOUR-ROW PLANTER

William N. Olson, Canton, Ill., assignor to International Harvester Company, a corporation of New Jersey Application September 17, 1954, Serial No. 456,704

3 Claims. (Cl. 172—624)

This invention relates to agricultural implements and particularly to planters of the type involving a pair of laterally spaced furrow opener units. More specifically the invention concerns laterally spaced furrow opener units adapted to travel upon previously prepared adjacent seed beds and to accommodate themselves to irregularities in the seed beds.

An object of the invention is the provision in an implement including laterally spaced furrow opener units adapted to travel in adjacent rows, means accommodating lateral tilting of the furrow opener units about a longitudinal axis therebetween to compensate for differences in the level of the ground over which the implement passes.

Another object of the invention is the provision of novel mounting means for attaching to a traveling support an implement including laterally spaced ground-engaging units, wherein novel means are provided compensating for irregularities in the ground over which the implement passes.

Another object of the invention is the provision in a planter or the like wherein laterally spaced furrow opener units are mounted upon a frame which, in turn, is mounted upon a traveling support by means accommodating lateral tilting of the implement about a longitudinal axis between said furrow forming units, of stabilizing means tending to hold the implement in a normal neutral operating position and to opposite said lateral tilting thereof.

Other objects and advantages of the invention will become clear from the following detailed description when read in conjunction with the accompanying drawings, wherein:

Figure 1 is a plan view of the rear end of a tractor having mounted thereon an implement incorporating the features of this invention and having parts thereof removed for clarity;

Figure 2 is a view in side elevation, partly in section, taken on the line 2—2 of Figure 1;

Figure 3 is a sectional view taken on the line 3—3 of Figure 2, and

Figure 4 is a sectional view taken on the line 4—4 of Figure 2.

Referring to the drawings, the numeral 10 designates the body of a tractor having a transverse rear axle structure 11 and laterally spaced drive wheels 12. A draft frame 13 extends longitudinally of the tractor below the body thereof, and is pivotally connected, in a manner not shown, at its forward end to the body of the tractor to accommodate vertical swinging movement of the draft frame, it being understood that suitable lift means may be provided upon the tractor and connected to the draft frame 13 for raising and lowering the latter.

The draft structure 13 is Y-shaped and comprises a pair of forwardly converging bars 14, only one of which is shown, and the rear ends of which extend rearwardly from the tractor. The rear end of each draft bar 14 is bent parallel with the direction of travel and engages a longitudinally extending short beam 15, the rear end of which is provided with a clamp 16 carrying one end of a transverse tool bar or tool carrier 17. A similar clamp 16 is carried by the corresponding beam 15 on the draft bar 14 at the other side of the tractor.

The rear end of each draft bar 14 is connected to the beam 15 by a pivot bolt 18 upon which is also mounted a pair of links 19 connected by a pin 20 above the upper edges of the bar 14 and beam 15. The forward end of beam 15 has welded thereto an angle bracket 21 having a transverse portion 22 apertured to receive a threaded bolt 23 which is adjustably received in a threaded eye 24 at the end of a bolt 25 passing through the forward end of beam 15 and the draft bar 14. By adjustment of bolt 23 the rear end of each of the draft bars 14 may be adjusted relative to the other in a vertical direction to level the draft frame 13. Raising and lowering of the draft frame 13 about its pivotal connection to the body of the tractor, and therefore raising and lowering of the tool bar carrier 17, is accomplished by suitable means including the chain 26, the lower end of which is connected to the pin 20 and the upper end of which is connected to the outer end of a rock arm 27 pivotally mounted on the tractor and connected by a rod 28 to a suitable source of power transmission on the tractor and preferably deriving power from the tractor power plant. It should likewise be understood that by virtue of the flexibility of the chain 26, the draft frame 13 is capable of vertical floating movement during operation of the implement, which is generally designated by the numeral 29.

It may be understood that, while only one implement 29 is shown, a plurality of such implements may be mounted upon the tool bar 17 at laterally spaced locations thereon. Lateral swinging of the transverse tool bar 17 and of the implement 29 is opposed by the provision of a brace 30, which is Y-shaped and comprises forwardly diverging arms 31 pivotally connected to brackets 32 affixed to and depending from the rear axle structure 11 of the tractor at opposite sides thereof. The stem 33 of the Y-shaped brace 30 is loosely received between a pair of laterally spaced bolts 34 extending vertically through a housing 35 clamped to the transverse tool bar 17 centrally thereof. The stem 33 is slidable between the bolts 34 so that vertical movement of the tool carrier 17 is not interfered with.

The parts of the implement 29 are shown in side elevation of Figure 2 but for the sake of clarity details are eliminated from the implement in Figure 1. Each implement 29 comprises a pair of laterally spaced furrow opening units 36, each of which comprises an earth-penetrating furrow-forming tool 37. Each unit 36 also includes a hopper 38, shown in Figure 2, having a dispensing tube 39 for discharging material from the hopper to the heel of the furrow-forming tool 37. The earth-penetrating tool 37 and the hopper 38, two of which are provided for each implement 29, are mounted at the ends of a transversely extending forward frame bar 40, square in cross section, forming a part of the implement supporting frame generally designated at 41.

Forming part of the implement frame 41 is a rearwardly extending U-shaped brace 42 having laterally extending arm portions 43 affixed to the transverse frame bar 40 and having a laterally extending connecting portion 44 at its rear end.

Affixed to the transverse part 44 of the U-shaped brace 42 is a vertically extending plate 45 to which is secured an upwardly extending bracket 46 having an angled part 47 apertured to receive the shank 48 of a crank 49. The lower end of the shank 48 is connected by a knuckle joint 50 with a threaded rod 51 receivable in a threaded sleeve 52, pivotally connected to a lug 53 affixed to a bar 54.

Bar 54 is part of a wheel supported sub-frame 55, the ends of the bar 54 being secured to the side bars 56, connected at their rear ends by the transverse part 57. Bars 56 are pivotally connected at their forward ends by pivot pins 58 to laterally spaced angle brackets 59 also affixed to the transverse frame bar 40. At this point it should be clear that manipulation of the crank 49 and rotation of the threaded rod 51 in sleeve 52 will adjust the sub-frame 55 in a vertical direction with respect to the main frame bar 40. Sub-frame 55 is supported by laterally spaced wheels 60 mounted at the ends of a transversely extending axle 61 rotatably supported in bearings 62 secured to the side bars 56. The purpose of this adjustment is to vary the operating depth of the furrow formers 37.

The planting apparatus of this invention is particularly adapted for use on previously prepared beds such as are prepared by middle busters and the like. Many times the laterally spaced beds formed by the middle buster, and upon which the furrow-forming unit 36 of this invention travels, are irregular in height at the time of planting, and unless this irregularity is compensated for, difficulties are encountered in the operation of the planter and non-uniform planting occurs, which creates, among others, problems in early cultivation and the like. By means of the present invention these irregular seed beds are automatically equalized and the furrow-forming units are caused to operate at substantially equal heights.

In order to compensate for the irregularity in height as between operating levels of the adjacent seed beds, applicant has provided means accommodating lateral tilting of his implement 29 about a longitudinal axis centrally located between the two furrow-forming units 36 and the ground-engaging wheels 60. This is accomplished by the provision of a vertically extending plate 63 affixed to the rear side of frame-bar 40 and projecting therebelow. Plate 63 is apertured to receive an elongated longitudinally extending pipe-like supporting member 64, the forward end of which is provided with a clamp 65 by which the member 64 is affixed to the tool carrier 17. The member 64 provides a rigid support for the implement frame, and by virtue of the latter's pivotal connection to the plate 63, accommodates lateral tilting of the implement about a central longitudinal axis to compensate for any irregularities encountered by the furrow-forming units 36 and the wheels 60. However, to allow the implement 29 to assume an angle due to the irregularities occurring in the height of adjacent seed beds, applicant has provided equalizing means by which the tendency of the implement to tilt is opposed, and the implement is maintained in a normal level operating position, and the irregular seed beds are automatically equalized by removing more dirt from the high bed than from the low bed during operation thereover.

This equalizing means includes transversely extending bar means 66 comprising arms 67 affixed at one end to the supporting member 64 and projecting laterally from opposite sides thereof. The opposite ends of the bar means 66 are apertured to receive the lower hooked ends of a pair of laterally spaced rods 68, the upper ends of which are threaded and which are slidably receivable in registering laterally spaced brackets 69 affixed to the forward part of the transverse frame bar 40. The upper end of each of the rods is threaded to receive one or more nuts 70 and a washer 71 engageable with the upper end of a spring 72 surrounding the rod 68 and engaging the bracket 69 at its lower end. The springs 72 act in compression and adjustment of the tension thereon may be made by adjusting the nuts 70. When an irregularity is encountered by one of the furrow-forming units 36, it tends to rise or to drop, and this is opposed by the action of the springs 72 which tend to force the implement to remain in a level position.

Novel equalizing means are thus provided for each implement 29 to assure its proper operation and to provide uniform planting in adjacent seed beds.

The frame of the implement 29 is also capable of vertical swinging movement about an axis represented by the pivotal connection of the supporting member 64 in the opening provided in plate 63 about a transverse axis. The implement is stabilized forwardly and rearwardly while accommodating this vertical swinging by virtue of the fact that the rear end of the supporting pipe 64 is slidably received in a slot 73 extending vertically and provided in the lower end of the plate 45.

It is believed that the operation of the planting apparatus of this invention will be clearly understood from the foregoing description. It should likewise be understood, however, that modifications may be made in the invention without departing from the spirit thereof or the scope of the appended claims.

What is claimed is:

1. In an implement having a substantially rigid frame and laterally spaced furrow forming units adapted for connection to a tractor having a transverse tool bar mounted thereon and means accommodating vertical movement of the tool bar, the combination of a longitudinally extending supporting member affixed at one end to said tool bar and projecting therefrom, means pivotally mounting said implement frame on said supporting member at the forward end thereof between said furrow forming units for tilting in a vertical plane about the longitudinal axis of said supporting member, lost motion means connecting said implement frame to said supporting member at a location laterally spaced from the axis thereof to accommodate said tilting of the implement frame, said lost motion means including spring means acting in compression opposing the tilting of the implement frame in either direction relative to said tool bar, and a part on the frame having a vertical slot therein to slidably receive and guide the rear end of said supporting member for limited relative movement therebetween.

2. The combination with a transverse tool bar attached to a traveling support of an implement having a substantially rigid frame and laterally spaced furrow-forming units mounted on the frame and vertically movable between positions corresponding to operating and transport positions of the implement, means for mounting the implement on said tool bar comprising a pivot member affixed at its forward end to said tool bar and extending longitudinally of the direction of travel of said support, means for pivotally mounting the implement frame on said pivot member at a location substantially on a center line between said furrow-forming units for lateral tilting of the implement about a longitudinal axis to opposite sides of a normal, neutral position, a stabilizing connection between the implement and said tool bar comprising laterally spaced lost motion means providing a connection therebetween on each side of said center line and including spring means biasing the implement to maintain said normal neutral position during operation of the implement, and means on the implement frame engageable with said pivot member at a location spaced rearwardly from said pivotal connection of the implement frame thereto to prevent lateral movement of the frame while accommodating vertical swinging thereof relative to said tool bar.

3. The combination with a transverse tool bar attached to a traveling support of an implement having a frame and laterally spaced furrow-forming units mounted on the frame, means for mounting the implement on said tool bar comprising a pivot member affixed to said tool bar and extending longitudinally of the direction of travel of said support, means for pivotally mounting the implement frame on said pivot member at a location substantially on a center line between said furrow-forming units for lateral tilting of the implement about a longitudinal axis to opposite sides of a normal, neutral position, and a stabilizing connection between the implement and said tool bar comprising transverse bar means affixed to said pivot member and extending laterally from opposite sides thereof below the forward end of said implement frame, a threaded rod attached to each end of said transverse bar means and extending vertically upwardly therefrom, said implement frame having apertures therein to slidably receive said rods, and compression springs surrounding said rods and engageable with said frame to urge the implement to maintain said normal, neutral position.

References Cited in the file of this patent

UNITED STATES PATENTS

| | | |
|---|---|---|
| 492,255 | Ashurst | Feb. 21, 1893 |
| 731,658 | Barry | June 23, 1903 |
| 882,379 | Gilbreath | Mar. 17, 1908 |
| 1,529,425 | Ferguson | Mar. 10, 1925 |
| 2,323,044 | Hyland | June 29, 1943 |
| 2,533,521 | Silver et al. | Dec. 12, 1950 |
| 2,624,256 | Todd | Jan. 6, 1953 |
| 2,656,776 | Cox et al. | Oct. 27, 1953 |
| 2,685,242 | Rusco | Aug. 3, 1954 |
| 2,725,649 | Santos | Dec. 6, 1955 |